(12) United States Patent
Chen et al.

(10) Patent No.: US 8,764,198 B2
(45) Date of Patent: Jul. 1, 2014

(54) PROJECTION SYSTEM HAVING ROTATIONALLY ASYMMETRICAL ILLUMINATION UNIT FOR EMITTING LIGHT ALONG OPTIC AXIS

(75) Inventors: Chun-Min Chen, Tainan County (TW); Ho-Chi Huang, Tainan County (TW); Teng-Kuei Wu, Tainan County (TW)

(73) Assignees: Himax Display, Inc., Tainan (TW); Himax Technologies Limited, Tainan (TW)

( * ) Notice: Subject to any disclaimer, the term of this patent is extended or adjusted under 35 U.S.C. 154(b) by 344 days.

(21) Appl. No.: 12/371,814

(22) Filed: Feb. 16, 2009

(65) Prior Publication Data
US 2009/0268166 A1 Oct. 29, 2009

Related U.S. Application Data

(63) Continuation-in-part of application No. 12/111,631, filed on Apr. 29, 2008, now Pat. No. 7,798,677.

(51) Int. Cl.
*F21V 7/00* (2006.01)

(52) U.S. Cl.
USPC .............................. 353/20; 362/309

(58) Field of Classification Search
CPC .................. F21V 7/0091; F21V 5/041–5/048; G02B 6/0073; G02B 6/0075–6/008
USPC .......... 353/20, 94, 98, 99; 362/296, 317, 333, 362/334, 335, 336, 337, 338, 520, 555, 800, 362/309
See application file for complete search history.

(56) References Cited

U.S. PATENT DOCUMENTS

| | | | | |
|---|---|---|---|---|
| 5,894,195 | A * | 4/1999 | McDermott | 313/512 |
| 6,176,586 | B1 * | 1/2001 | Hirose et al. | 353/31 |
| 6,575,582 | B2 * | 6/2003 | Tenmyo | 362/16 |
| 6,724,543 | B1 * | 4/2004 | Chinniah et al. | 359/718 |

(Continued)

FOREIGN PATENT DOCUMENTS

| | | |
|---|---|---|
| CN | 1311566 | 9/2001 |
| CN | 1731011 | 2/2006 |

(Continued)

OTHER PUBLICATIONS

"Office Action of Taiwan Counterpart Application", issued on Apr. 9, 2013, p. 1-p. 13.

*Primary Examiner* — Francis M Legasse, Jr.
*Assistant Examiner* — Bao-Luan Le
(74) *Attorney, Agent, or Firm* — J. C. Patents

(57) ABSTRACT

A projection system including an illumination unit, a polarization conversion unit, a light valve, a projection lens, and a polarizing beam split (PBS) element is provided. The polarization conversion unit includes a V-shaped PBS element, a wave plate, and two reflective surfaces. The V-shaped PBS element includes a first PBS portion and a second PBS portion. The first PBS portion is adapted to be passed through by a first partial beam with a first polarization direction and reflect a second partial beam with a second polarization direction. The second PBS portion is adapted to be passed through by a third partial beam with the first polarization direction and reflect a fourth partial beam with the second polarization direction. The wave plate is disposed in the transmission paths of the first partial beam and the third partial beam. The reflective surfaces are located at opposite sides of the V-shaped PBS element.

17 Claims, 8 Drawing Sheets

(56) References Cited

U.S. PATENT DOCUMENTS

| | | | |
|---|---|---|---|
| 7,083,297 B2 * | 8/2006 | Matthews et al. | 362/184 |
| 7,270,454 B2 * | 9/2007 | Amano | 362/522 |
| 7,401,948 B2 * | 7/2008 | Chinniah et al. | 362/326 |
| 7,441,929 B2 * | 10/2008 | Stefanov et al. | 362/336 |
| 7,465,075 B2 * | 12/2008 | Chinniah et al. | 362/336 |
| 7,514,722 B2 * | 4/2009 | Kawaguchi et al. | 257/98 |
| 7,618,160 B2 * | 11/2009 | Chinniah et al. | 362/326 |
| 7,729,578 B2 * | 6/2010 | Alasaarela et al. | 385/33 |
| 7,837,349 B2 * | 11/2010 | Chinniah et al. | 362/244 |
| 7,837,359 B2 * | 11/2010 | Danek et al. | 362/309 |
| 8,172,441 B2 * | 5/2012 | Ishida | 362/518 |
| 8,304,994 B2 * | 11/2012 | Duelli | 315/111.21 |
| 2002/0080615 A1 * | 6/2002 | Marshall et al. | 362/333 |
| 2004/0070855 A1 | 4/2004 | Benitez et al. | 359/858 |
| 2007/0086204 A1 * | 4/2007 | Chinniah et al. | 362/520 |
| 2007/0263390 A1 * | 11/2007 | Timinger et al. | 362/308 |
| 2009/0225552 A1 * | 9/2009 | Chen | 362/333 |

FOREIGN PATENT DOCUMENTS

| | | |
|---|---|---|
| CN | 101018975 | 8/2007 |
| JP | 2005-347224 | 12/2005 |
| TW | 560085 | 11/2003 |

* cited by examiner

PROJECTION SYSTEM HAVING ROTATIONALLY ASYMMETRICAL ILLUMINATION UNIT FOR EMITTING LIGHT ALONG OPTIC AXIS

CROSS-REFERENCE TO RELATED APPLICATION

This application is a continuation-in-part of a prior application Ser. No. 12/111,631, filed on Apr. 29, 2008, now pending. The entirety of the above-mentioned patent applications is hereby incorporated by reference herein and made a part of this specification.

BACKGROUND OF THE INVENTION

1. Field of the Invention

The present invention relates to a display system. More particularly, the present invention relates to a projection system.

2. Description of Related Art

The projector system requires a light source to illuminate the imager for projection. The light emitting diode (LED) is a preferable choice because of its small physical size, low-power consumption, long lifetime and availability of three primary colors. The LED has been widely used in many areas of general lighting, and driven by these applications to make it better and better in optical efficiency and color saturation.

The LED is typically packaged with an LED die or dies on a metal support for heat dissipation. The electrical connections are made from the LED die or dies to the bonding pads, which are on top of the metal support by a layer of isolation. Most of the LED die or dies are further surrounded and protected by a plastic encapsulation. The typical plastic encapsulation is a flat layer or a hemisphere dome of epoxy. This plastic encapsulation can extract more light from the LED die or dies, and is referred as the primary optics of the LED. The LED in the flat encapsulation emits the light in a well-known Lambertian distribution, and the LED in the hemisphere encapsulation emits the light in a more collimated Gaussian distribution.

FIG. 1 shows a conventional LED 10, which includes a support 11, a LED die or array of dies 12, bonding pads 13 and a plastic encapsulation 14. The support 11 is shown as a flat metal support, on which the LED die or dies 12 are adhered to. The bonding pads 13 were on top of the metal support with a layer of isolation 15, and the electric connections 16 are made form the LED die or dies 12 to the bonding pads 13. A plastic encapsulation 14 in a form of flat layer, hemisphere or any other curvature surrounds the LED die or dies 12 for the protection. This plastic encapsulation 14 is also served as the primary optics to extract more light from the LED die or dies 12 with different angular distributions.

FIG. 2 shows a diagram of the projection system with the LED. In detail, it shows a typical reflective-type projector system 20 with an LED 21 as the illuminant. The LED 21 can be the same as the LED 10 shown in FIG. 1. A secondary optics 22 is placed in front of the LED 21 to converge the light from a wider angular distribution to a more directional angular distribution. The light will then pass through an optional pre-polarizer 23 to a polarizing beam splitter (PBS) 24, which reflects the polarized light to a reflective imager 25. The typical reflective imager is for example a liquid-crystal-on-silicon (LCOS) microdisplay. This reflective imager 25 modulates and reflects the light back to the PBS 24, and then through an optional post-polarizer 26 to a projection lens 27 for the projection.

FIG. 3 shows a conventional secondary optics 30 of the LED used in the projector systems. The LED 31 can be the same as the LED 10 shown in FIG. 1. The secondary optics 30 is a set of lenses, which can be spherical, aspherical, or diffractive lenses. This set of lens elements is commonly referred as the condenser lens. The LED 31 is placed in the focal point of the condenser lens. The light emission from the LED and falls into this condenser lens can be collected by this condenser lens and be converged in a more directional and collimated way for illumination of the imager in the projector system. Only the light, which enters the condenser lens, can be collected by the condenser lens. Therefore, the diameter of the condenser lens has to be large and the focal length has to be shorter for the condenser lens to collect more light from the LED emission. As a result, the condenser lens by the spherical or aspherical construction is large and bulky. It is also difficult to collect all the light from the LED 41, and hence, the coupling efficiency of the LED to the imager is low. Replacing the spherical or aspherical lens by a diffractive lens can reduce the thickness of the condenser lens, but the coupling efficiency is still low and further suffered by the scattering loss on the diffractive surface of the diffractive lens.

FIG. 4 shows another secondary optics 40 of the LED 41 for light illumination. The LED 41 can be the same as the LED 10 shown in FIG. 1. The secondary optics 40 is a compound parabolic collimator (CPC) and is placed above the LED 41. The light emission from the LED 41 enters the flat bottom surface 42 of the CPC and will be reflected at the parabolic wall 43 by total internal reflection (TIR), and then exits from the flat top surface 44. This secondary optics 40 can collect the light emission which is from the LED 41 and enters the bottom surface 42, and pass the light out through the top surface 44 in a specific angular distribution according to the parabolic wall 43. This kind of secondary optics is a long and symmetrical cylinder, and passes the light into a symmetric cone for particular light illumination.

FIG. 5 shows another secondary optics 50 of the LED 51 for general lighting. The LED 51 can be the same as the LED 10 shown in FIG. 1. The secondary optics 50 is placed on top of the LED 51 and covers the LED 51. The secondary optics with an inner refractive lens 53, an inner refractive wall 54, an outer reflective wall 55 and a flat top surface 56, is placed on top of the LED 51 and covers the LED 51. This secondary optics 50 can collect all the light emission from the LED 51, and pass the light out in a specific angular distribution according to the surfaces of 53, 54, 55 and 56. The surfaces 55 and 56 are typical straight or flat. A subsequent patent (U.S. Pat. No. 6,547,423) proposed to change these two surfaces to more generally cured surfaces for an improved performance and reduced size. This kind of secondary optics is a shallow and symmetric disk, and passes the light into a symmetric cone for general lighting.

In summary, the primary optics of the LED is to extract more light from the LED die or dies to increase the external efficiency of the LED, while the secondary optics will be more application dependent. For the projector system, the secondary optics of the LED is to improve the directionality of the light emission from the LED to the imager of the projector system, or to increase the coupling efficiency of the LED to the imager of the projector system with all the light extracted from the primary optics of the LED. However, the light emission from the LED is not collimated or directional enough for the projector system. In addition, the light emission from the LED is in a rotational symmetric cone, which does not match the aspect ratio of the imager of the projector system such as 4:3 or 16:9. For the necessity, a new structure of the illumination unit is preferred for the projector systems.

Additionally, in a conventional projection system, a polarization conversion system (PCS) with many polarizing beam split (PBS) coatings is disposed in the light path between the light source and display panel to convert the non-polarized light from the light source into polarized light. However, the more the PBS coatings are used, the more the cost of the projection system is, such that the cost thereof is hard to reduce.

SUMMARY OF THE INVENTION

Accordingly, the present invention is directed to a projection system, which has higher optical efficiency and a lower cost.

A polarization conversion unit including a V-shaped polarizing beam split (PBS) element, a wave plate, and two reflective surfaces is provided in an embodiment of the present invention. The V-shaped PBS element includes a first PBS portion and a second PBS portion. The first PBS portion is adapted to be passed through by a first partial beam of a light beam with a first polarization direction and reflect a second partial beam of the light beam with a second polarization direction. The second PBS portion is connected to the first PBS portion, and an angle greater than 0 degree and less than 180 degrees is included between the first PBS portion and the second PBS portion. The second PBS portion is adapted to be passed through by a third partial beam of the light beam with the first polarization direction and reflect a fourth partial beam of the light beam with the second polarization direction. The wave plate is disposed in the transmission paths of the first partial beam from the first PBS portion and the third partial beam from the second PBS portion. The wave plate is adapted to convert the first partial beam and the third partial beam with the first polarization direction into a fifth partial beam with the second polarization direction. The two reflective surfaces are located at two opposite sides of the V-shaped PBS element and adapted to respectively reflect the second partial beam and the fourth partial beam from the V-shaped PBS element. The second partial beam and the fourth partial beam from the reflective surfaces and the fifth partial beam from the wave plate are combined into an illumination beam with the second polarization direction.

A projection system including an illumination unit, the above polarization conversion unit, a light valve, a projection lens, and a PBS element is provided in another embodiment of the present invention. The illumination unit is for emitting the light beam, and the polarization conversion unit is disposed in the transmission path of the light beam. The light valve is disposed in the transmission path of the illumination beam and adapted to convert the illumination beam into an image beam. The projection lens is disposed in the transmission path of the image beam. The PBS element is disposed in the transmission paths of the illumination beam and the image beam and adapted to allow the illumination beam to be transmitted to the light valve and to allow the image beam to be transmitted to the projection lens.

Compared with the conventional PCS which has many polarizing beam splitters, since the polarization conversion unit in the embodiments of the present invention has only a V-shaped PBS element, the polarization conversion unit has a lower cost, which further reduces the cost of the projection system. In addition, the polarization conversion unit converts the light beam into the illumination beam with the second polarization direction, but does not abandon the partial beam of the light beam with the first polarization direction, such that the polarization conversion unit achieves higher optical efficiency, thus further improving the optical efficiency of the projection system.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
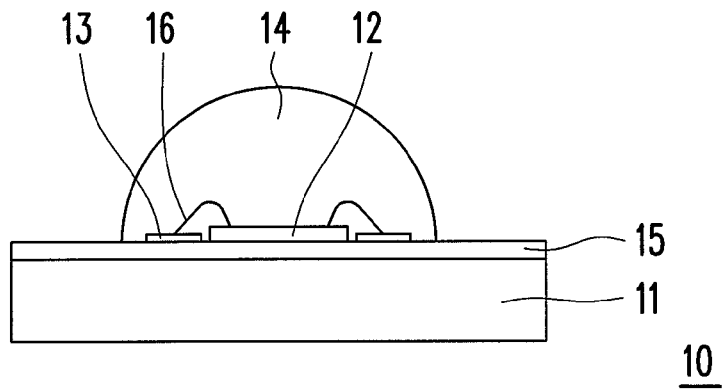
FIG. 1 is a conventional LED.
Figure 2:
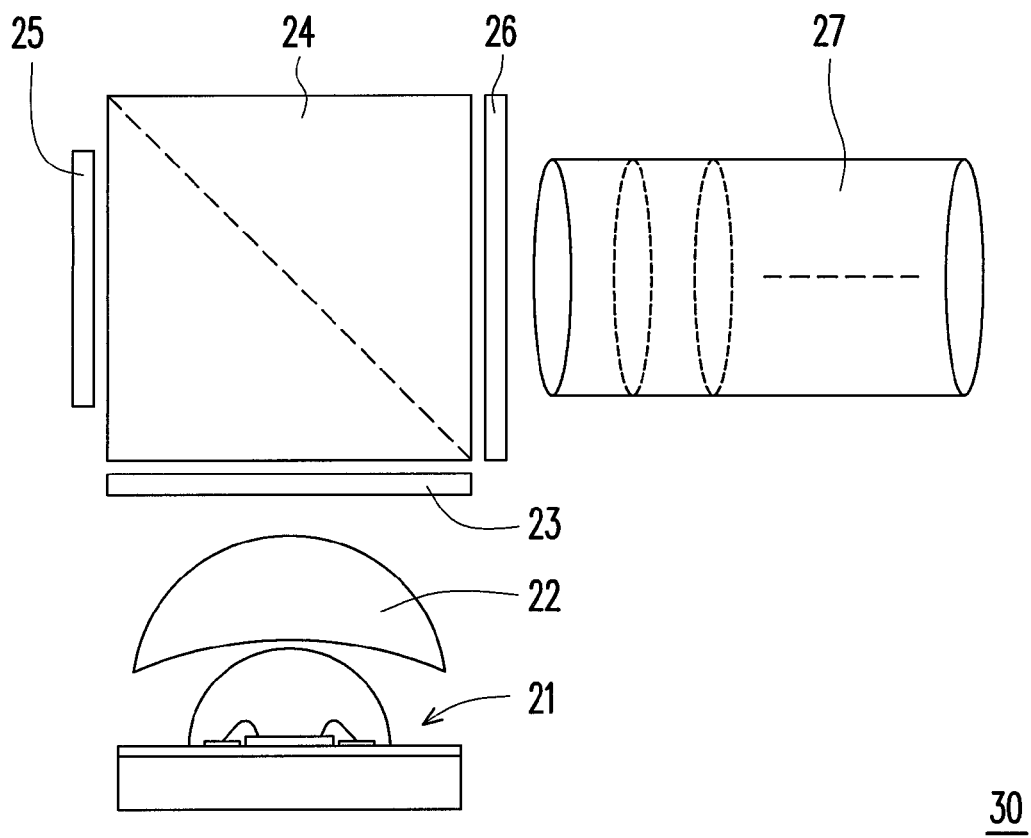
FIG. 2 is a diagram of the projection system with the LED.
Figure 3:
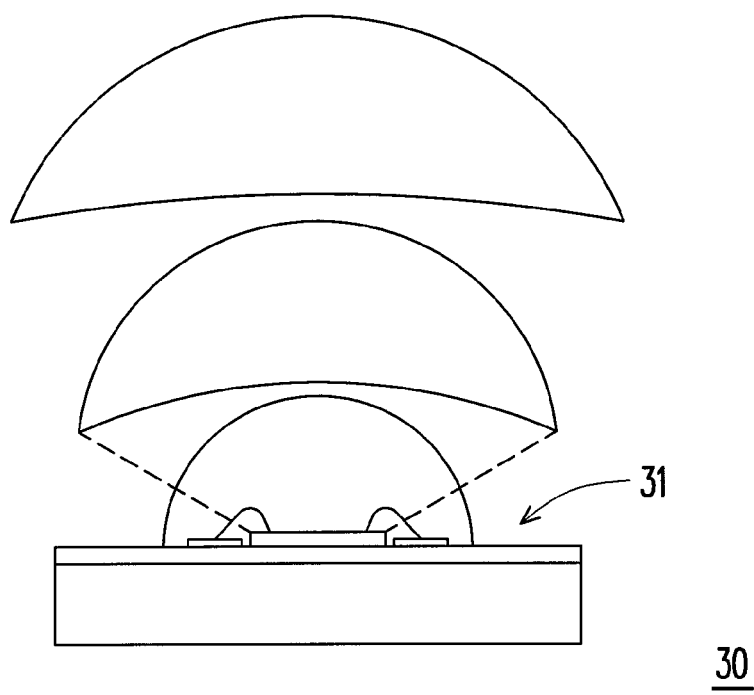
FIG. 3 is a diagram of a conventional secondary optics of the LED.
Figure 4:
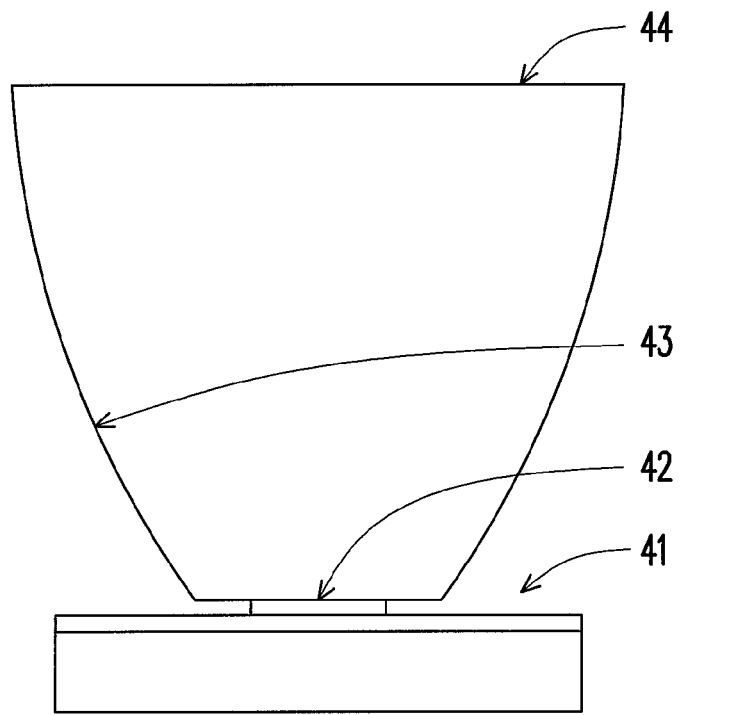
FIG. 4 is a diagram of another secondary optics of the LED.
Figure 5:
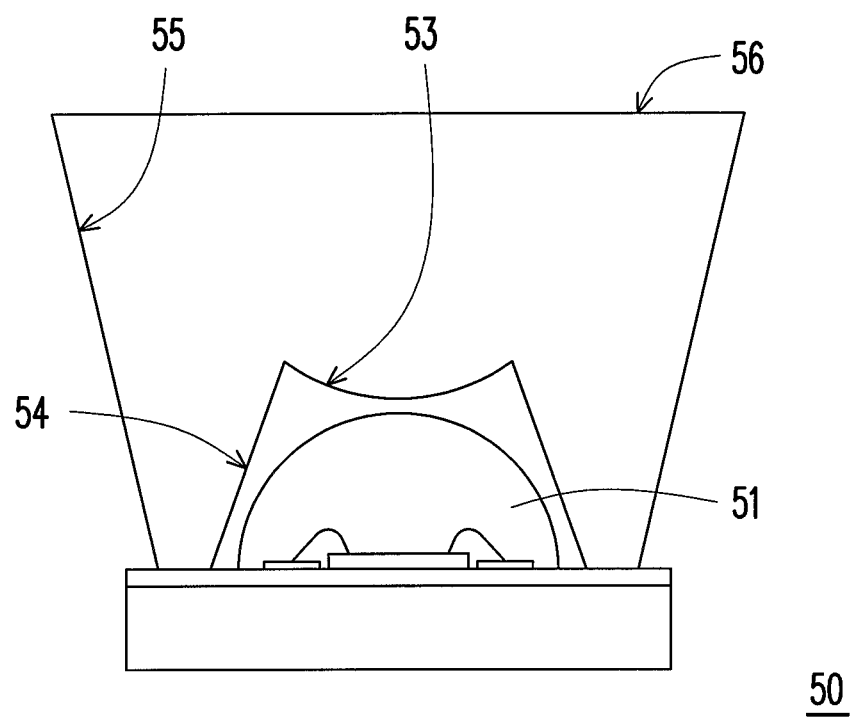
FIG. 5 is a diagram of another secondary optics of the LED.

Reference will now be made in detail to the present preferred embodiments of the invention, examples of which are illustrated in the accompanying drawings. Wherever possible, the same reference numbers are used in the drawings and the description to refer to the same or like parts.

It should be noted that in the following description of the embodiments, the illuminant of the illumination unit is exemplary the light emitting diode (LED). It is noted that although the LED is adopted to implement the illumination unit, any person skilled in the art can utilize other substituted elements to put the embodiment of the present invention into practice, and not in limitation.

Figure 6:
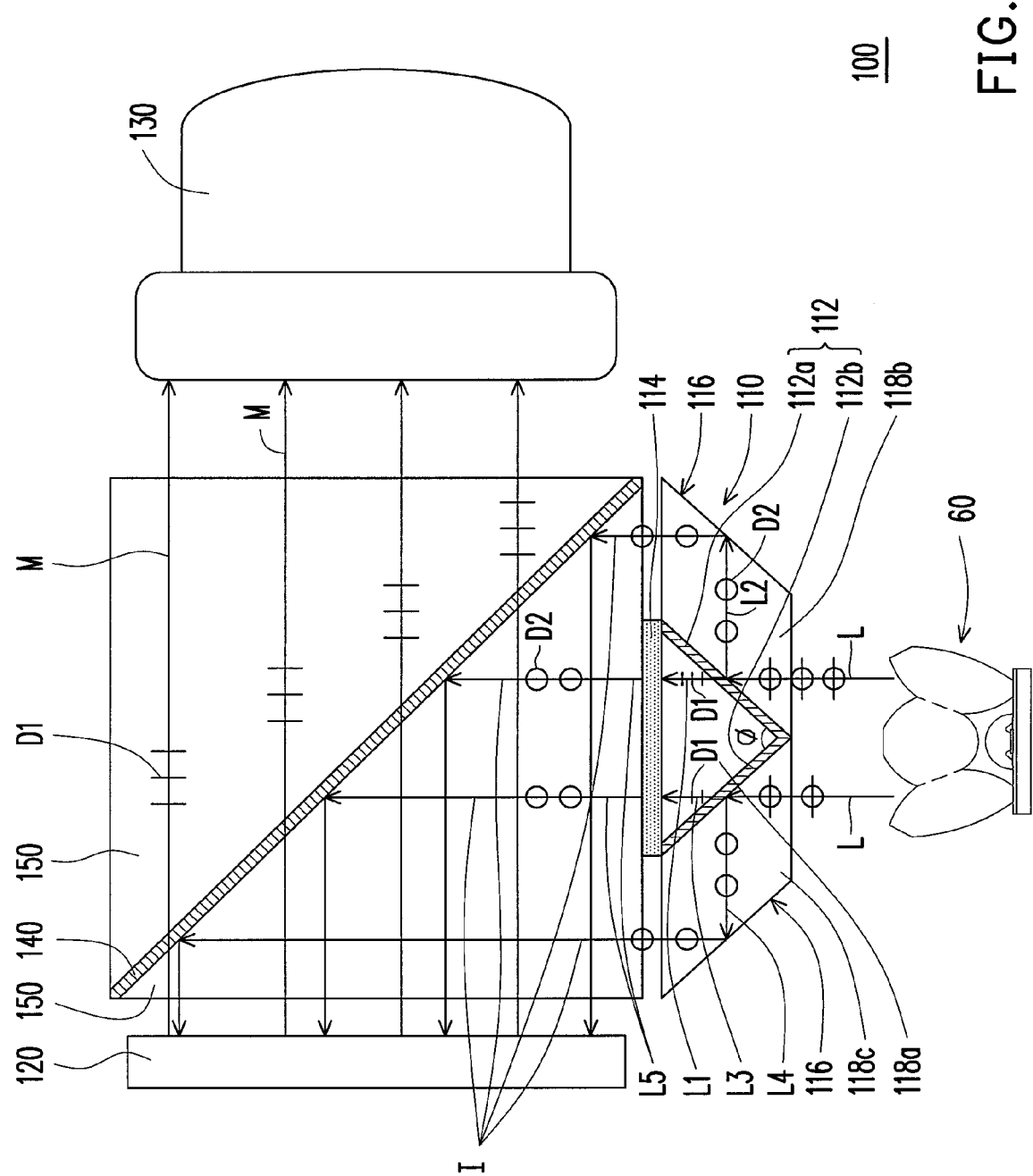
FIG. 6 is a schematic structural view of a projection system according to an embodiment of the present invention.

FIG. 6 is a schematic structural view of a projection system according to an embodiment of the present invention. Referring to FIG. 6, the projection system 100 of this embodiment includes an illumination unit 60, a polarization conversion unit 110, a light valve 120, a projection lens 130, and a PBS element 140. The illumination unit 60 is for emitting a light beam L. In this embodiment, the light beam L is a non-polarized beam. The polarization conversion unit 110 is disposed in the transmission path of the light beam L and includes a V-shaped polarizing beam split (PBS) element 112, a wave plate 114, and two reflective surfaces 116. The V-shaped PBS element 112 includes a first PBS portion 112a and a second PBS portion 112b. The second PBS portion 112b is connected to the first PBS portion 112a, and an angle (p greater than 0 degree and less than 180 degrees is included between the first PBS portion 112a and the second PBS portion 112b.

The first PBS portion 112a is adapted to be passed through by a first partial beam L1 of the light beam L with a first polarization direction D1 and reflect a second partial beam L2 of the light beam L with a second polarization direction D2. In this embodiment, the first polarization direction D1 is perpendicular to the second polarization direction D2. More particularly, the first polarization direction D1 and the second polarization direction D2 are, for example, a P polarization direction and an S polarization direction, respectively. However, in other embodiments, the first polarization direction D1 and the second polarization direction D2 may be the S polarization direction and the P polarization direction, respectively. The second PBS portion 112b is adapted to be passed through by a third partial beam L3 of the light beam L with the first polarization direction D1 and reflect a fourth partial beam L4 of the light beam L with the second polarization direction D2. The wave plate 114 is disposed in the transmission paths of the first partial beam L1 from the first PBS portion 112a and the third partial beam L3 from the second PBS portion 112b. The wave plate 114 is adapted to convert the first partial beam L1 and the third partial beam L3 with the first polarization direction D1 into a fifth partial beam L5 with the second polarization direction D2. In this embodiment, the wave plate 114 is, for example, a half wave plate, and adapted to convert the first partial beam L1 and the third partial beam L3 with the P polarization direction into the fifth partial beam L5 with the S polarization direction.

The two reflective surfaces 116 are located at two opposite sides of the V-shaped PBS element 112 and adapted to respectively reflect the second partial beam L2 and the fourth partial beam L4 from the V-shaped PBS element 112. The second partial beam L2 and the fourth partial beam L4 from the reflective surfaces 116 and the fifth partial beam L5 from the wave plate 114 are combined into an illumination beam I with the second polarization direction D2.

In this embodiment, the polarization conversion unit 110 further includes a first prism 118a, a second prism 118b, and a third prism 118c. The second prism 118b leans against the first prism 118a. The first PBS portion 112a is a PBS film located a junction surface of the first prism 118a and the second prism 118b, and one of the reflective surfaces 116 is located on the second prism 118b. The third prism 118c leans against the first prism 118a. The second PBS portion 112b is a PBS film located at a junction surface of the first prism 118a and the second prism 118c, and the other one of the reflective surfaces 116 is located on the third prism 118c.

In this embodiment, the two reflective surfaces 116 are total internal reflection (TIR) surfaces to totally internally reflect the second partial beam L2 and the fourth partial beam L4 respectively. In more detail, the incident angle of the second partial beam L2 incident on the reflective surface 116 is greater than the critical angle, and the incident angle of the fourth partial beam L4 incident on the reflective surface 116 is also greater than the critical angle, such that the second partial beam L2 and the fourth partial beam L4 are totally internally reflected.

The light valve 120 is disposed in the transmission path of the illumination beam I and adapted to convert the illumination beam I into an image beam M. In this embodiment, the light valve 120 is, for example, a liquid-crystal-on-silicon (LCOS) panel which converts the illumination beam I with the second polarization direction D2 into the image beam M with the first polarization direction D1. However, in other embodiments, the light valve may be a digital micro-mirror device (DMD) or other appropriate light valves.

The projection lens 130 is disposed in the transmission path of the image beam M for projecting the image beam M onto a screen (not shown) to form image frames. The PBS element 140 is disposed in the transmission paths of the illumination beam I and the image beam M and adapted to allow the illumination beam I to be transmitted to the light valve 120 and to allow the image beam M to be transmitted to the projection lens 130. In this embodiment, the PBS element 140 is adapted to reflect the illumination beam I with the second polarization direction D2 to the light valve 120, and to be passed through by the image beam M with the first polarization direction D1 which is then transmitted to the projection lens 130. However, in other embodiments, the PBS element 140 may be adapted to be passed through by the illumination beam I with the second polarization direction D2, and to reflect the image beam M with the first polarization direction D1.

In this embodiment, the projection system 100 further includes two prisms 150 which lean against each other, and the PBS element 140 is a PBS film located at a junction surface of the two prisms 150. However, in other embodiments, the PBS element 140 may be a PBS plate.

Compared with the conventional PCS which has many polarizing beam splitters, since the polarization conversion unit 110 in this embodiment has only a V-shaped PBS element 112, the polarization conversion unit 110 has a lower cost, which further reduces the cost of the projection system 100. In addition, the polarization conversion unit 110 converts the light beam L into the illumination beam I with the second polarization direction D2, but does not abandon the partial beam of the light beam L with the first polarization direction D1, such that the polarization conversion unit 110 achieves higher optical efficiency, thus further improving the optical efficiency of the projection system 100. Moreover, in this embodiment, the second partial beam L2 and the fourth partial beam L4 are totally internally reflected by the reflective surface 116, but not just partially reflected, thus further improving the optical efficiency of the polarization conversion unit 110 and the projection system 100.

Figure 7:
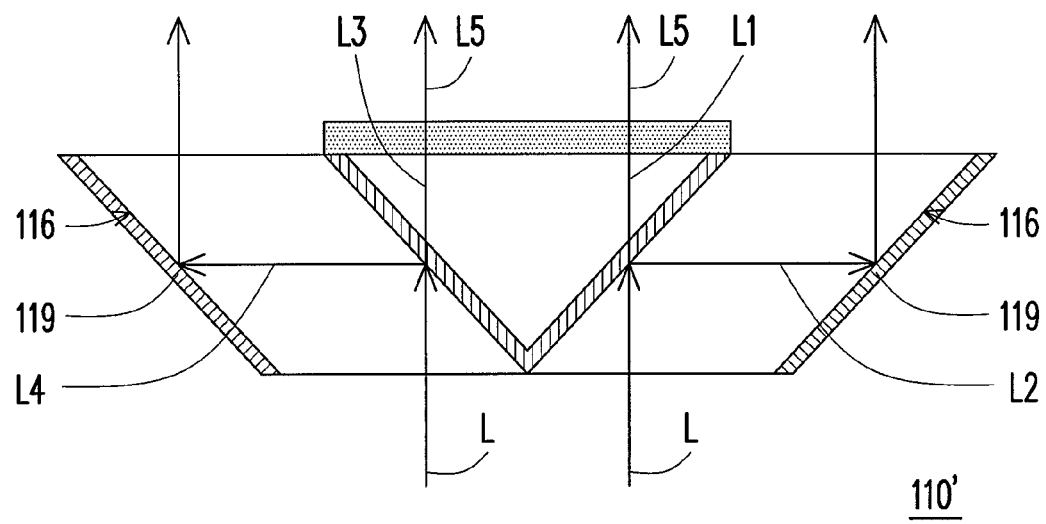
FIG. 7 is a schematic structural view of a polarization conversion unit of a projection system according to another embodiment of the present invention.

FIG. 7 is a schematic structural view of a polarization conversion unit of a projection system according to another embodiment of the present invention. Referring to FIG. 7, the polarization conversion unit 110' of this embodiment is similar to the above polarization conversion unit 110 shown in FIG. 6, and the difference between them is as follows. In this embodiment, the polarization conversion unit 110' further includes two reflective films 119 respectively disposed on the two reflective surfaces 116 to reflect the second partial beam L2 and the fourth partial beam L4 respectively.

Figure 8:
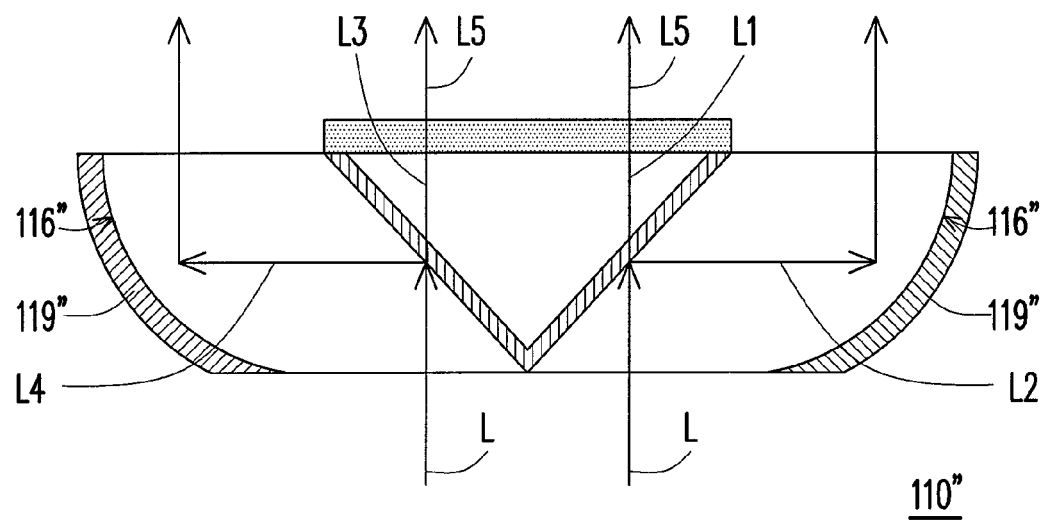
FIG. 8 is a schematic structural view of a polarization conversion unit of a projection system according to another embodiment of the present invention.

FIG. 8 is a schematic structural view of a polarization conversion unit of a projection system according to another embodiment of the present invention. Referring to FIG. 8, the polarization conversion unit 110'' of this embodiment is similar to the above polarization conversion unit 110' shown in FIG. 7, and the difference between them is as follows. In this embodiment, two reflective surfaces 116'' of the polarization conversion unit 110'' are curved surfaces, and two reflective films 119'' on the two reflective surfaces 116'' are curved with the reflective surfaces 116''. In more detail, the two reflective surfaces 116'' are, for example, convex surfaces, which not only reflect the second partial beam L2 and the fourth partial beam L4 but also converge the second partial beam L2 and the fourth partial beam L4, thus further improving the optical efficiency of the projection system.

Referring to FIG. 6, the illumination unit 60 in the present invention may be any kind of light source module which provides the light beam L. Several illumination units are provided as examples hereinafter, which is not intended to limit the present invention.

Figure 9:
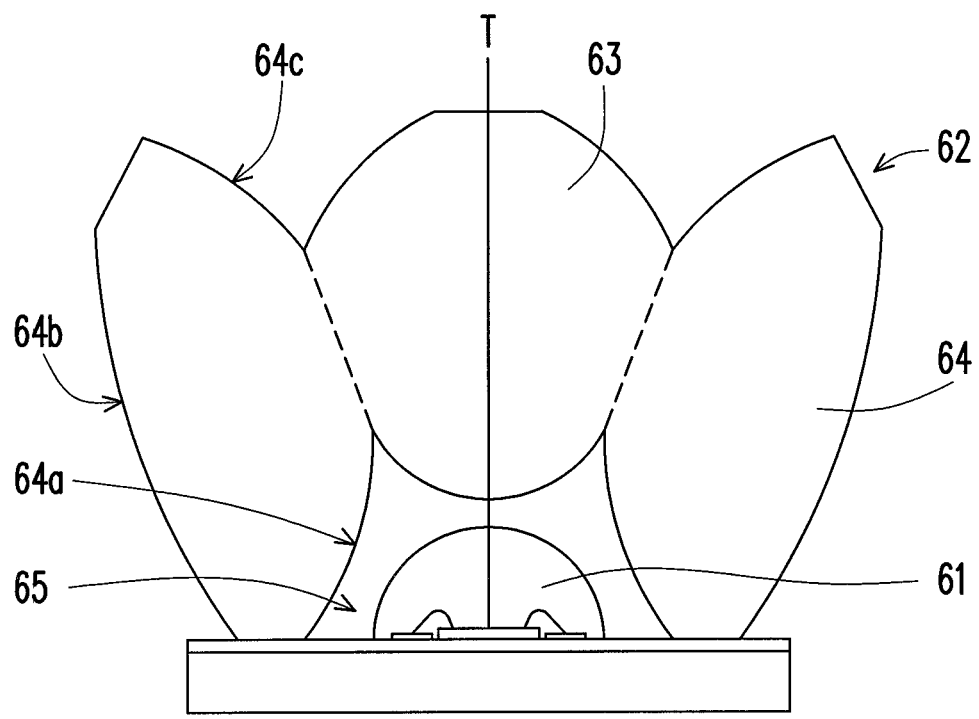
FIG. 9 is a schematic cross-section view of a secondary optics of the LED according to an exemplary embodiment of the present invention.

FIG. 9 shows a schematic cross-section view of a secondary optics according to an exemplary embodiment of the present invention. The illumination unit 60 comprises an LED 61 and a secondary optics. The LED 61 can be the same as the LED 10 shown in FIG. 1. The collimator lens 62 is referred as the secondary optics of the LED. Referring to FIG. 9, the collimator lens 62 comprises a central part 63 and a peripheral part 64. A hollow 65 is formed by these two parts for situating the LED 61. An optic axis T corresponds to the light emission path of the collimator lens 62. In the present embodiment, the central part 63 of the collimator lens 62 is basically a condenser lens, which collects the light emission from the LED 61 within a certain angle with respect to the optic axis T for passing the light into a small cone. The peripheral part 64 of the collimator lens 62 has three curvatures, which construct a set of lens elements. The first curvature 64a collects all the light falling into this part and transmits the light to the second curvature 64b, which is a reflect surface. This second curvature 64b reflects the light to the third curvature 64c, which passes the light into the small cone out of the peripheral part. The light emission angle out of the peripheral part would be the same or close to that of the central part.

Since the light beam emitted out of the collimator lens 62 is transmitted into a small cone, such that the light beam is adapted to be transmitted into the above polarization conversion unit 110 shown in FIG. 6, and this is one of the reasons why the above polarization conversion unit 110 needs only a V-shaped PBS element 112 shown in FIG. 6. Moreover, the light beam emitted out of the collimator lens 62 is also adapted to be transmitted into the above polarization conversion unit according to the other embodiments such as the polarization conversion unit 110' or 110".

Figure 10:
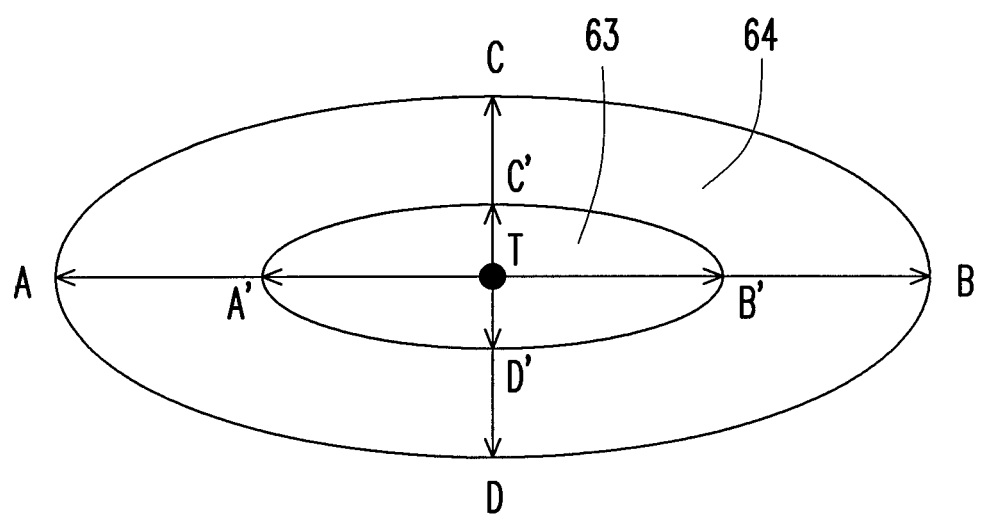
FIG. 10 is a schematic top view of the secondary optics of the LED according to the exemplary embodiment in FIG. 9.

FIG. 10 is a schematic top view of the secondary optics according to the exemplary embodiment in FIG. 9 of the present invention. In the present embodiment, both the central part 63 and the peripheral part 64 of the collimator lens 62 are not necessarily cylindrically symmetric. As a matter of fact, an oval design of the collimator lens 62 is preferred. Referring to FIG. 9 and FIG. 10, the node T represents the optic axis corresponding to the collimator lens 62. The node T of the optic axis is defined as a vector which is perpendicular to the surface and points from the inside of the element to the outside of the element through the surface. The central part 63 and the peripheral part 64 are respectively oval-shaped. The line segment AB, which passes through the node T, is a major axis of the oval-shaped peripheral part 64, and the line segment CD, which passes through the node T, represents a minor axis of the oval-shaped peripheral part 64. Similarly, the line segment A'B' and line segment C'D' respectively represent a major axis and a minor axis of the oval-shaped central part 63. An aspect ratio of the oval shape is defined by the ratio of the minor axis to the major axis. In the present embodiment, the typical aspect ratio of this oval optics is 95%, but can be in the range of 91 to 99% by different applications. With this oval shape of the collimator lens 62 of the secondary optics, the light emission pattern would not be a circular, but an elliptical shape that matches better the 4:3 or 16:9 aspect ratio of the imager in the projector system.

Figure 11:
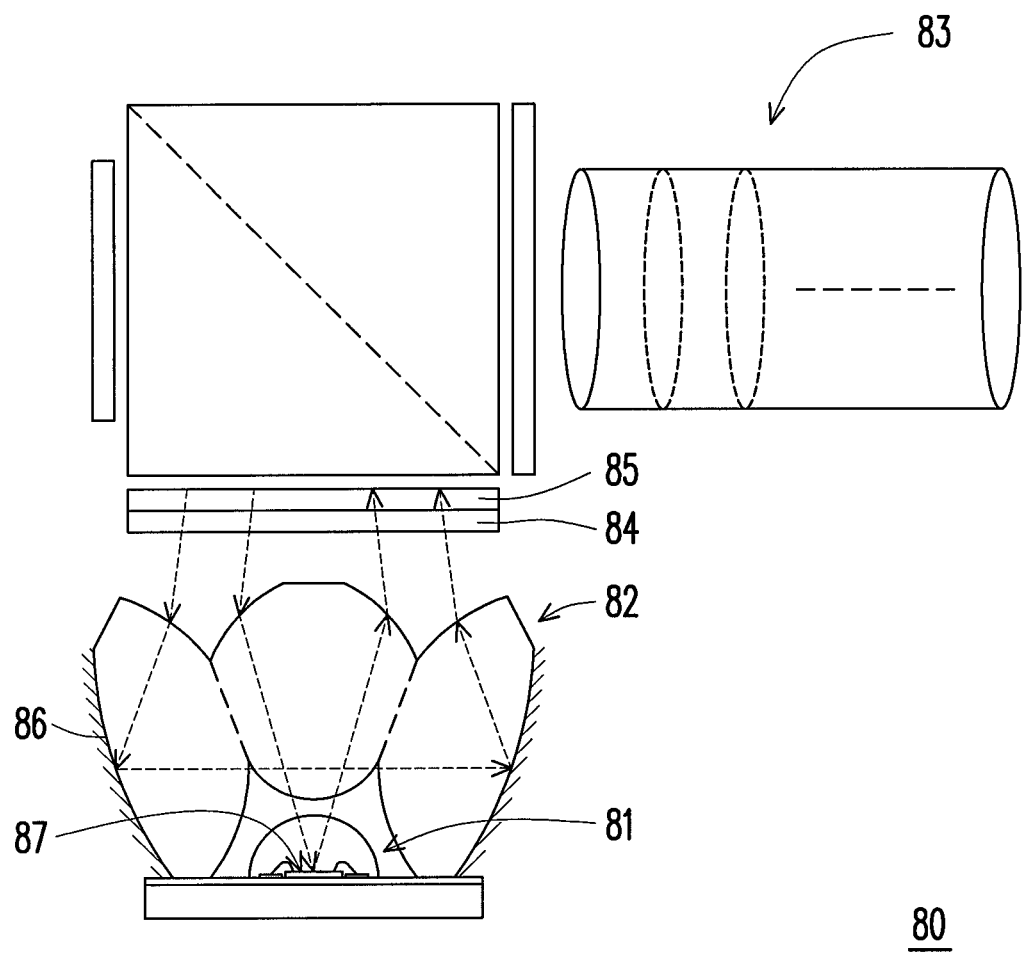
FIG. 11 is a diagram of a projector system with the secondary optics of the LED according to another exemplary embodiment of the present invention.

FIG. 11 shows a diagram of a projector system with the secondary optics according to another exemplary embodiment of the present invention. The collimator lens 82 surrounds the LED 81 to converge all the light emission from the LED 81 to a more directional angular distribution. An optional quarter-wave plate 84 and a reflective polarizer 85 can be placed in front of the secondary optics to pass only the p-polarization of light to the imager, and reflects the other s-polarization of light back to the collimator lens. Parts of the reflected light into the peripheral part of the collimator lens will be reflected by the reflected curvature 86 to the other side of the reflected curvature, and be reflected again to pass out of the collimator lens. Parts of the reflected light into the central part of the collimator lens will be reflected by the emitting surface 87 of the LED die or dies, and back to the central part and out of the collimator lens. These reflected light beams will go through the quarter-wave plate 84 again and transfer from the s-polarization to the p-polarization, and pass the reflective polarizer 85. The light will then pass to a polarizing beam splitter (PBS) 86, which reflects the polarized light to a reflective imager 87. The typical reflective imager is for example a liquid-crystal-on-silicon (LCOS) microdisplay. This reflective imager 87 modulates and reflects the light back to the PBS 86, and then through an optional post-polarizer 88 to a projection lens 83 for the projection. A simple polarization conversion scheme can be implemented by this collimator lens.

Figure 12:
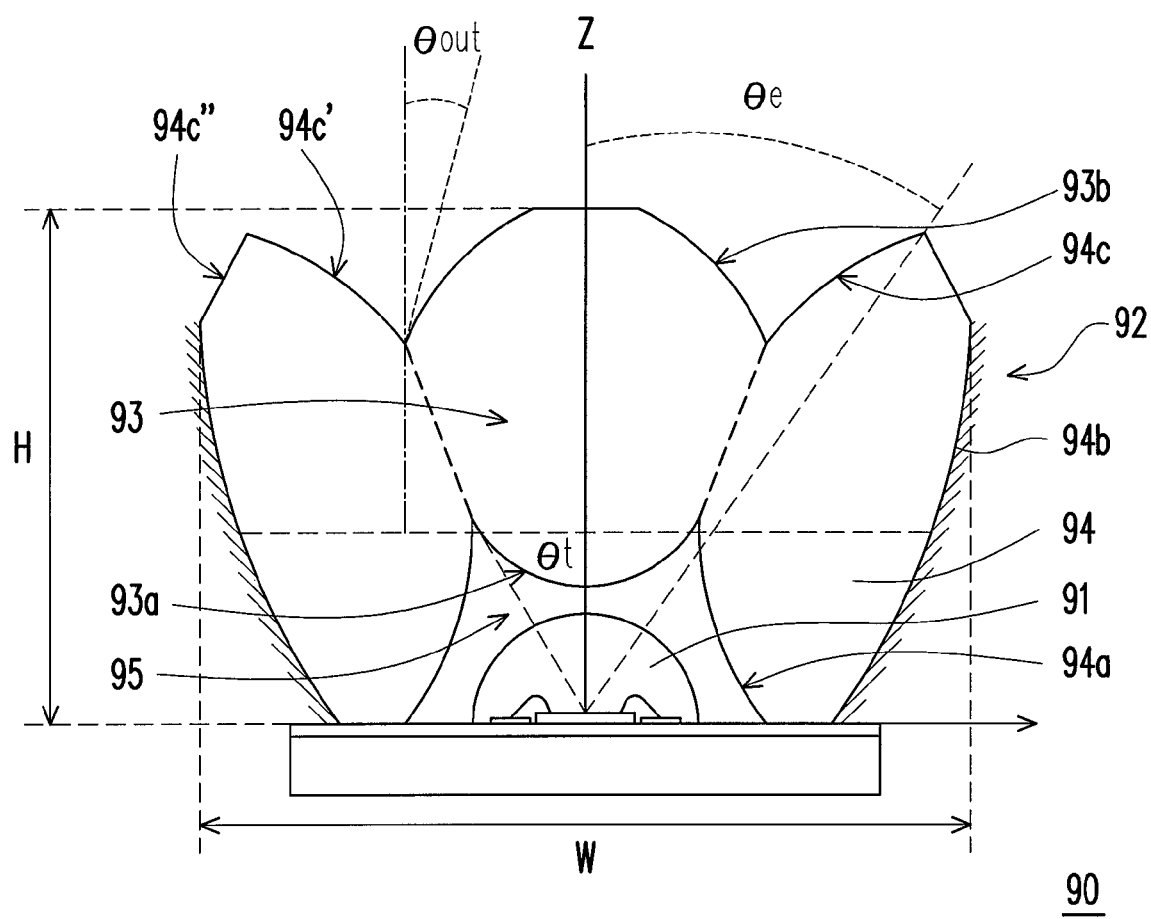
FIG. 12 is a detailed drawing of the schematic cross-section view of the secondary optics of the LED according to the exemplary embodiment in FIG. 9.

FIG. 12 shows a detailed drawing of the schematic cross-section view of the secondary optics of the LED according to the exemplary embodiment in FIG. 9. of the present invention. FIG. 12 is the same as FIG. 7, but with more parameters for better description of this illumination unit 90. The LED 91 comprises an emitting surface of an LED die or array of dies, or a thin phosphor layer coated on and excited by such an LED die or array of dies. In the present embodiment, the emitting surface corresponds to x-y plane of a Cartesian xyz coordinate system in FIG. 12. The optic axis T extends along the axis Z of the Cartesian xyz coordinate system. The LED 91 is usually packaged with an optically transmissive encapsulant such as a plastic encapsulation over the emitting surface of the LED die or dies for the protection of the LED die or dies. It depends on the shape of this plastic encapsulation, which is often referred as the primary optics of the LED 91, the light emission distribution from the LED 91 can be very different. The light emission from such a packaged LED can be from Lambertian to Gaussian distributions over a full hemisphere of solid angle, corresponding to an emission angle θe with respect to the optic axis that ranges from 0 to 90 degrees as shown in FIG. 9.

The collimator lens 92 as the secondary optics is one piece of plastic element and can be made by low-cost plastic molding. The collimator lens 92 comprises a central part 93 and a peripheral part 94. The central part 93 has a first light transmission surface 93a and a second light transmission surface 93b opposite to the first light transmission surface 93a. The peripheral part 94 around the central part 93 has an inner refraction wall 94a coupled to the first light transmission surface 93a to form a hollow 95 for situating the LED 91, an outer reflection wall 94b opposite to the inner refraction wall 94a, and a refraction surface 94c connecting to the second light transmission surface 93b and the outer reflection wall 94b. In the present embodiment, both the central part 93 and the peripheral part 94 of the collimator lens 92 are rotationally asymmetrical corresponding to the optic axis T. A top view of the central part 93 is a first oval shape and a top view of the peripheral part 94 is a second oval shape as described in FIG.

11. The aspect ratio of the first oval shape is between 91% and 99% and the aspect ratio of the second oval shape is between 91% and 99%.

Referring to FIG. 12, the first light transmission surface 93a and the second light transmission surface 93b of the central part 93 form a condenser lens to converge the light from a wider angular distribution into a more directional and a smaller angular distribution of an output angle θout. The typical output angle θout of the central part 93 is 15 degrees corresponding to typical projection optics. However, this output angle θout can also be from 10 to 20 degrees, to match the f-number of the projection optics. There is a threshold angle θt, to divide the collimator lens 92 into the central part 93 and peripheral part 94, and this typical threshold angle is 55 degrees, but can be in a range of 40 to 70 degrees. The first light transmission surface 93a and the second light transmission surface 93b can be spherical or aspherical, but the aspherical surfaces are preferred since only two surfaces would be used for the design of this central condenser lens. These two aspherical lens surfaces are designed by point-point curve fitting with a ray-tracing optical tool. The first light transmission surface 93a can be placed very close to the LED 91 to minimize the height H of the collimator lens 92. The typical height H of the collimator lens 92 is from 5 to 15 mm in the present embodiment, and makes the illumination unit 90 very compact.

The peripheral part 94 of the collimator lens 92 has three surfaces, inner refraction wall 94a, outer reflection wall 94b and refraction surface 94c, respectively. These three surfaces can again form a condenser lens to converge the light from a wider angular distribution into a more directional and a smaller angular distribution of an output angle θout. The typical output angle θout of the peripheral part 94 is 15 degrees corresponding to typical projection optics. However, this output angle θout can also be from 10 to 20 degrees, to match the f-number of the projection optics. This output angle θout of the peripheral part can be the same or slightly different from the output angle θout of the central part. The surfaces 94a, 94b and 94c can be spherical or aspherical, but the aspherical surfaces are preferred since only three surfaces would be used for this peripheral condenser lens. In the present embodiment, the inner refraction wall 94a and the refraction surface 94c are transmissive, while the outer reflection wall 94b is reflective, which can be form by reflected mirror, total internal reflection, or reflective dielectric coating for example. As shown in the FIG. 12, the refraction surface 94c of the peripheral part 94 can further comprises a first curved surface 94c' connecting to the second light transmission surface 93b and a flat surface 93c'' connecting to the outer reflection wall 94b. The first curved surface 94c' collects the light falling into this part and passes the light in a specific angular distribution of an output angle θout in the range of 10 to 20 degrees. The flat surface 93c'' collects the light falling into this part and converge the light into a more directional and a smaller angular distribution. People ordinary skilled in the art have well known that the refraction surface 94c can be form with any different structure by different applications. The typical width W of the collimator lens 92 is from 10 to 25 mm in the present embodiment, and makes the illumination unit 90 very compact.

In summary, compared with the conventional PCS which has many polarizing beam splitters, since the polarization conversion unit in the embodiments of the present invention has only a V-shaped PBS element, the polarization conversion unit has a lower cost, which further reduces the cost of the projection system in the embodiments of the present invention. In addition, the polarization conversion unit converts the light beam into the illumination beam with the second polarization direction, but does not abandon the partial beam of the light beam with the first polarization direction, such that the polarization conversion unit achieves higher optical efficiency, thus further improving the optical efficiency of the projection system.

Moreover, the above embodiments disclose the collimator lens of the secondary optics for illumination unit. The light passed through the secondary optics can be in any specific angular distribution by different designs of the surfaces on the secondary optics. The illumination angular distribution can be an elliptic shape by the oval design of the secondary optics, to match better the aspect ratio of the imager of the projectors. The optical efficiency of the projector system would be high because of the close matching of the illumination cone with the aspect ratio of the rectangular imager. The compact LED illumination unit with the secondary optics and the common LED is particularly useful and efficient for small projector systems using small imagers like LCOS or other microdisplays.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:
1. A projection system comprising:
an illumination unit for emitting a light beam, wherein the light beam emitted from the illumination unit is along an optic axis for the projection system, and the illumination unit comprises:
an LED die; and
a collimator lens comprising:
a central part having a first light transmission surface and a second light transmission surface opposite to the first light transmission surface; and
a peripheral part around the central part having an inner refraction wall coupled to the first light transmission surface to form a hollow for situating the LED die, an outer reflection wall opposite to the inner refraction wall, and a refraction surface connecting to the second light transmission surface and the outer reflection wall,
wherein both the central part and the peripheral part of the collimator lens are rotationally asymmetrical corresponding to the optic axis;
wherein the refraction surface comprises a first curved surface and a flat surface, an end of the first curved surface connects to the second light transmission surface and another end of the first curved surface connects to an end of the flat surface to form a vertex, and another end of the flat surface connects to the outer reflection wall where the flat surface without being curved is tilted relative to the optic axis, and a normal vector of the flat surface is not parallel to the optic axis;
wherein the first curved surface protrudes from the peripheral part toward the optic axis; and
wherein the first curved surface tilts relative to the optic axis, and an angle included between the first curved surface and the second light transmission surface and outside of the collimator lens is greater than 0 degree and less than 90 degrees;
a polarization conversion unit disposed in the transmission path of the light beam and comprising:
a V-shaped polarizing beam split (PBS) element comprising:

a first PBS portion adapted to be passed through by a first partial beam of the light beam with a first polarization direction and reflect a second partial beam of the light beam with a second polarization direction; and a second PBS portion connected to the first PBS portion, wherein an angle greater than 0 degree and less than 180 degrees is included between the first PBS portion and the second PBS portion, the second PBS portion is adapted to be passed through by a third partial beam of the light beam with the first polarization direction and reflect a fourth partial beam of the light beam with the second polarization direction;

a wave plate disposed in the transmission paths of the first partial beam from the first PBS portion and the third partial beam from the second PBS portion, wherein the wave plate is adapted to convert the first partial beam and the third partial beam with the first polarization direction into a fifth partial beam with the second polarization direction; and two reflective surfaces located at two opposite sides of the V-shaped PBS element and adapted to respectively reflect the second partial beam and the fourth partial beam from the V-shaped PBS element, wherein the second partial beam and the fourth partial beam from the reflective surfaces and the fifth partial beam from the wave plate are combined into an illumination beam with the second polarization direction;

a light valve disposed in the transmission path of the illumination beam and adapted to convert the illumination beam into an image beam;

a projection lens disposed in the transmission path of the image beam; and a PBS element disposed in the transmission paths of the illumination beam and the image beam and adapted to allow the illumination beam to be transmitted to the light valve and to allow the image beam to be transmitted to the projection lens.

2. The projection system according to claim 1, wherein the wave plate is a half wave plate.

3. The projection system according to claim 1, wherein polarization conversion unit further comprises:

a first prism;

a second prism leaning against the first prism, wherein the first PBS portion is a PBS film located at a junction surface of the first prism and the second prism, and one of the reflective surfaces is located on the second prism; and a third prism leaning against the first prism, wherein the second PBS portion is a PBS film located at a junction surface of the first prism and the third prism, and the other one of the reflective surfaces is located on the third prism.

4. The projection system according to claim 1, wherein the reflective surfaces are total internal reflection surfaces to totally internally reflect the second partial beam and the fourth partial beam respectively.

5. The projection system according to claim 1, wherein the polarization conversion unit further comprises two reflective films respectively disposed on the two reflective surfaces to reflect the second partial beam and the fourth partial beam respectively.

6. The projection system according to claim 1, wherein the two reflective surfaces are curved surfaces.

7. The projection system as claimed in claim 1, wherein a front view of the central part is a first oval shape and a front view of the peripheral part is a second oval shape.

8. The projection system as claimed in claim 1, wherein the collimator lens is one piece of plastic element.

9. The projection system as claimed in claim 1, wherein the illumination unit further comprises an optically transmissive encapsulant covering the LED die.

10. The projection system as claimed in claim 1, wherein the first light transmission surface and the second light transmission surface of the central part of the collimator lens are spherical or aspherical.

11. The projection system as claimed in claim 1, wherein the outer reflection wall of the peripheral part of the collimator lens is formed with a reflected mirror, a total internal reflection, or a dielectric coating.

12. The projection system as claimed in claim 1, wherein the central part of the collimator lens is a condenser lens.

13. The projection system as claimed in claim 1, wherein the central part of the collimator lens passes light into a small cone between 10 and 20 degrees.

14. The projection system as claimed in claim 1, wherein the peripheral part of the collimator lens passes light into a small cone between 10 and 20 degrees.

15. The projection system as claimed in claim 1, wherein the height of the collimator lens is between 5 to 15 mm.

16. The projection system as claimed in claim 1, wherein the width of the collimator lens is between 10 to 25 mm.

17. The projection system as claimed in claim 7, wherein the aspect ratio of the first oval shape is between 91% and 99% and the aspect ratio of the second oval shape is between 91% and 99%.

* * * * *